United States Patent Office 3,500,541
Patented Mar. 17, 1970

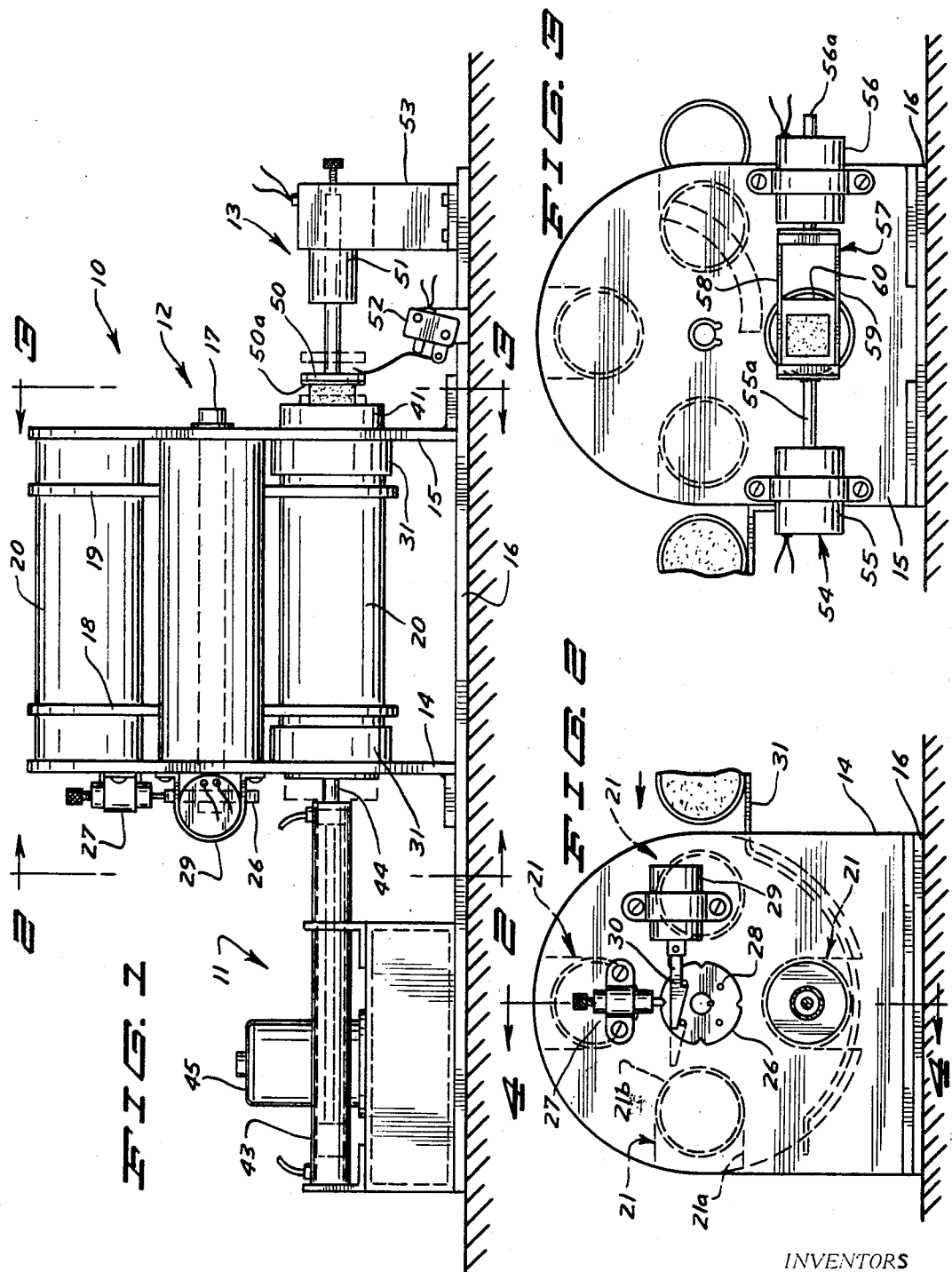

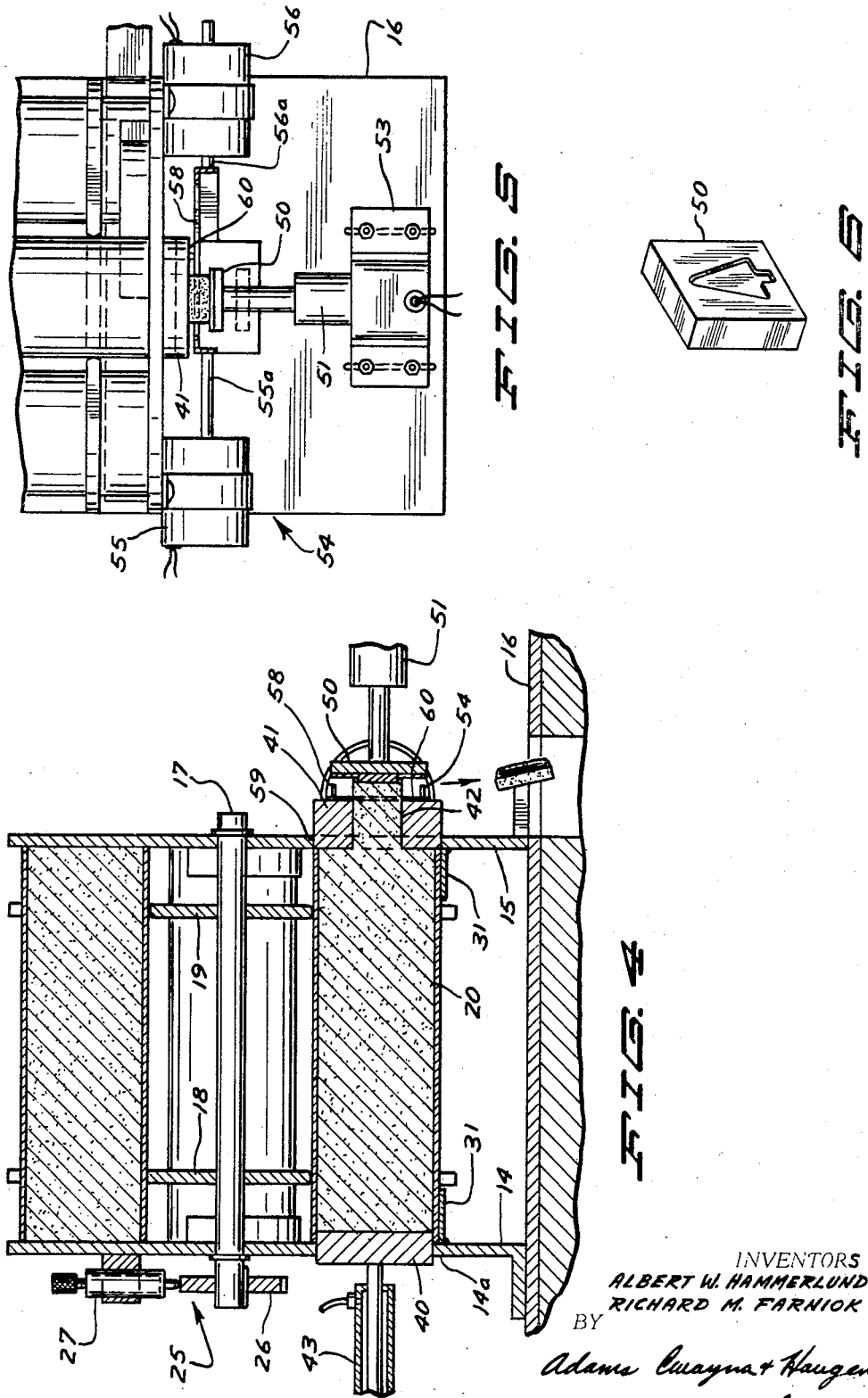

3,500,541
BUTTER PATTY FORMING DEVICE
Albert W. Hammerlund, Jr., 58 6th Ave. S., Hopkins, Minn. 55343, and Richard M. Farniok, Rte. 1, Box 137, Delano, Minn. 55328
Filed Feb. 28, 1968, Ser. No. 708,881
Int. Cl. A01j *21/02, 23/00*
U.S. Cl. 31—14                                        8 Claims

ABSTRACT OF THE DISCLOSURE

This invention relates to a device for the forming of butter patties and the like and includes means for providing the butter in extrudable containers, power ram means for applying the necessary extruding force to the butter to force the same through a dye plate and form the proper exterior shape of the butter patty, means for sensing the length of the extrusion and slicing means actuated by said length sensing means for cutting the butter from the extruded length. The means for sensing the length of the extrusion may also be provided with impression dies on a surface thereof to form a design into one face of the patty. The device may logically be a continuous operating device wherein containers of butter are arranged in sequential relation to the extruding die portions of the device to position a filled container in proper forming positon after a preceeding container has been emptied.

---

In the past the making of butter patties for use in restaurants and other commercial establishments has been a time consuming and labor consuming task. The device provided herein by applicant affords a user of such butter patties a machine which will form, cut and impress designs upon patties automatically and quickly. The concept provided by applicant is mainly of providing an extrudable container of butter with ram means pushing the same from the container through a forming die and onto an impression die or if no impression is desired, onto a sensing plate. The plate is designed to sense the length of the extrusion and when the proper length is obtained to actuate means for cutting the patty from the extruded length. This entire system is automatic and will only require reloading of the containers as they are emptied.

It is therefore an object of applicants' invention to provide means for extruding butter and cutting the same into predetermined lengths for use as butter patties.

It is a further object of applicants' invention to provide a butter patty forming machine having means associated therewith for impressing designs or shapes into at least one surface of the formed patty.

It is a further object of applicants' invention to provide a butter patty forming device which may be substantially automatic in its operation necessitating only the filling of the device with containers containing the butter to be extruded and removing the empty containers from the device.

It is still a further object of applicants' invention to provide means for sensing the length of extruded materials and cutting the same from the extruded length after a predetermined length has been extruded.

These and other objects and advantages of our invention will more fully appear from the following description made in connection with the accompanying drawings, wherein like reference characters refer to the same or similar parts throughout the several views, and in which:

FIG. 1 is a side elevation of a device embodying applicants' concept for forming patties from bulk butter;
FIG. 2 is a vertical section taken substantially along line 2—2 of FIG. 1 illustrating an end view of the extrusion chamber section;
FIG. 3 is a vertical section taken substantially along line 3—3 of FIG. 1 illustrating the side of the extrusion section opposite that of FIG. 2;
FIG. 4 is a vertical section taken substantially along line 4—4 of FIG. 2;
FIG. 5 is a partial plan view illustrating the cutoff section of applicants' device; and
FIG. 6 is illustrative of the type of butter patty which may be formed with applicants' device.

In accordance with applicants' concept and the accompanying drawings a butter patty forming machine generally designated 10 includes a first power section 11 an extrusion section 12 and a cutoff section 13. In general the concept of the device is to provide containers of the butter to be formed in the extrusion section 12 and thereafter align the containers with the ramming or power section 11 forcing the butter therefrom through an extrusion dye into the cutoff area 13 where the length of the extruded material is sensed and is thereafter cutoff. In the cutoff section 13 an impressing device may also be provided with the sensing device to place a design on one surface of the patty.

The extrusion section 12 in the form shown includes a pair of longitudinally spaced upright support members 14–15 mounted upon a common base 16 which base also serves to hold the power section 11 and the cutoff section 13. These uprights 14–15 provide bearing surfaces for a pivotally mounted shaft member 17 which shaft member is provided with at least a pair of radially extending flange members 18–19 spaced longitudinally thereof intermediate the vertical support members 14–15. This shaft member 17 and the accompanying flanges 18–19 provide housing devices for butter confining containers 20 which are inserted therein for revolvement into and out of extruding position. The individual plate members 18–19 are provided with equally spaced radially inwardly extending container retaining openings generally designated 21, and in the form shown four of these openings 21 are provided spaced equally about the periphery of the flange elements 18–19. These openings 21 include inwardly extending side portions 21a with an arcuate bottom portion 21b thereon. The shape of these openings 21 is agreeable and in conformance with the dimensions of the individual butter container devices 20 such that they may be received therein and frictionally held therein as the flanges 18–19 are carried by the rotatably mounted shafts 17. Locating means generally designated 25 are provided on one end of the extruding section 12 and in the form shown include a first index plate member 26 fixedly mounted for rotation with shaft 17 and a spring and ball locating detent device or the like generally designated 27 mounted in workable association to the indexing plate 26. For automatic operation a plurality of pins 28 may be positioned on the face of plate 26 and a solenoid device 29 having a hook element 30 extending therefrom may be positioned with respect to the plate 26 and pins 28 to automatically index the device and carry the butter containers 20 when one of the containers has been emptied through the extruding process.

Guide means such as a generally arcuate flange member 31 may be provided to underlie the respective ends of the containers 20 to more positively assure that a loading action as designated by the arrow in FIG. 2 will properly align a new container with one of the container openings 21 on the flanges 18–19 and will hold the same in proper extruding position as the same is moved into the extruding position which is in the form shown in the lowermost portion of the circular revolvement of the shaft 17 and flanges 18–19.

It should be obvious that this particular extrusion section 12, although illustrating a plurality of butter containers 20 arranged about the carrying flanges 18–19 may provide the same effect with a single device which would incorporate means for holding a single container 20 in position for extruding. This single arrangement would lend itself to non-automatic situations and it should be obvious that this would not depart from the scope of the invention.

In order to provide extrusion forces onto the containers and to the contained butter a passage 14a must be provided in one of the outstanding flanges 14 to permit the power ram 40 to pass into the butter container. A similar opening must be provided on the opposite of such flanges 15 to permit the attachment of an extrusion die 41 to plate 15 which extrusion die is naturally provided with an opening 42 therethrough for forming the outer configuration of the extruded patty.

The ram or power section previously designated 11 includes, in the form shown, a hydraulic cylinder 43 having its extendable ram portion 44 thereof fixedly attached to a ram 40 which ram enters the butter container 20. Naturally power means such as a fluid motor 45 would be provided to supply the necessary hydraulic pressure to the cylinder 43. Again, valving means must be applied for the cylinder to permit its forward and rearward movement into and out of the butter containers 20 and valves such as this and controls such as this are commonly known in the art. The important factor of sanitation in handling food products would require that a vegetable oil type cylinder and ram be provided although it is obvious that other such sanitary elements could be provided to provide the necessary butter to the ram 40.

The cut off section 13 includes a first patty receiving plate device 50 arranged on the actuating end of a power solenoid 51 or the like with a sensing element in the form shown encompassing a microswitch 52 in actuating relation to the plate 50 to permit sensing of the length of the patty being extruded and designed to actuate cutting elements when the proper length has been extruded. The plate 50 in the form shown may encompass a die face 50a which may be designed with an artistic design thereon to impress the same onto the surface of the butter pressed thereagainst.

A solenoid 51 mounted to plate 50 is designed to be a power retraction type with spring loaded forward movement and is mounted on a base 53 attached to the frame base 16 of the device. The operation of this particular solenoid 51 and the accompanying plate 50 is that, upon extrusion of butter, the butter will abut with the plate 50 forcing the same rearwardly. When the plate 50 contacts the microswitch 52, the position of which is, and should be, obviously adjustable for predetermined lengths, the microswitch will actuate the solenoid 51 to retract the plate 50 from the surface of the butter and permit the cutting action to take place. By moving the plate 50 from contacting the butter, the butter will, when cut, be free to drop from the unit into a collection area such as is illustrated in FIG. 4 through the base 16. After the butter has been cut which cutting may be controlled through a simple timing sequence or through tripping devices associated with the cutting sections of the unit, the solenoid 51 will be de-energized and the plate 50 will return to its butter contacting position.

The cutting device generally designated 54 in the form shown includes a pair of solenoids 55–56 mounted on the frame portion 15 which solenoids may be either of the push or pull variety, each of which includes a ram element 55a–56a to which a frame device generally designated 57 is attached. The frame element 57 includes a pair of spaced transversely extending elements 58–59 having a cutter blade 60 mounted intermediate the ends thereof which cutter element 60 is a relatively thin slicing element such as a wire which will pass through the extruded butter and cut the same from the remaining extruded portions.

It should be obvious that this particular wire will operate in most temperature ranges but that the same could be supplied with heat if required.

The forms for holding the butter are, in the form shown, open ended containers 20. It should be obvious that this is a relatively new butter containing form for use with an extrusion device and the applicant contemplates that the containers 20 may be made of fiber material as well as metallic material. Obviously, for sanitary conditions, it may be necessary to provide end covers for the containers 20 but in use the machine is so designed that the containers 20 will fit into the flanges 18–19 of the device and the ends thereof will be in substantially close engagement with the respective upright supports 14–15 of the device. These containers must be of sufficient peripheral strength to hold the butter therein while the same is being extruded therefrom and fibrous can bodies have developed to the state of the art where this is of no particular problem.

The operation of the device should be obvious from the described structure but a brief operational statement will now be made. The butter is provided in containers and is inserted in the case of a multiple machine into one of the openings 21 on the respective flanges 18–19. Naturally in a single extrusion unit this flange device would not be necessary but it would be simply a case of inserting a single container 20 into proper extruding position. The proper length adjustment is now made on the microswitch 52 and the plate 50 will normally lie relatively close to the end of the extrusion die 42. Upon actuation of the power section 11 the ram and accompanying piston 40 will move into the container 20 and start the extrusion of the butter from the die end 41 thereof. As this butter abuts with the plate 50 the plate will be moved rearwardly to trip the microswitch 52. Upon tripping thereof the following sequence of events which must be acknowledged to be substantially simultaneous will occur. The tripping of the microswitch 52 will engage the solenoid 51 to pull the plate 50 rearwardly from the butter extrusion. This same actuation will engage one of the solenoids of the cutting section 54 such that either through a push or a pull action a cutting blade 60 will cut through the extruded length of butter. It should be obvious that this cutting element 60 should be very close to the end of the die 41 such that the same will cut the extruded patty rather than possibly bend the extruded length which could occur if the slicing element 60 were spaced a great distance from the die 41. Cut off devices may either be provided internally of the respective solenoids 55–56 or external sensors could be provided such that when the slicing has taken place the plate 50 will be returned to its butter contacting position which will be accomplished by de-energizing the solenoid 51. It should be obvious that this slicing may be completely a step process wherein the power to the ram 43 is cycled in accordance with the cutting and removal operation or it could be through a substantially simultaneous arrangement with the ram moving effectively slowly enough, a continuous ramming and extruding function while the butter is being cut.

Is should be obvious that applicant has provided a unique butter extrusion device which will permit the utilization of a new container form for butter and which will accomplish the making of butter patties having decorative impressions on one side thereof a relatively simple task.

It will, of course, be understood that various changes may be made in the form, details, arrangements and proportion of parts without departing from the scope of our invention.

What is claimed is:

1. A device for the forming of butter patties and the like including:
   (a) a power ram section having an extensible and retractable ram member;
   (b) a supply container for holding an amount of butter therein;

(c) means for retaining said supply container in aligned position with respect to said ram member to permit the ram to pass into said container and force the butter therefrom;

(d) die means in receiving relation to said container to receive the butter forced therefrom and provide a peripheral shape thereto; and (e) cut off means adjacent said die means for cutting a length of butter as it passes from said die means;

(f) and sensing means for sensing the length of extruded butter exiting from said die means to actuate said cut off means.

2. The structure set forth in claim 1 wherein said sensing means includes a movable plate member arranged in aligned, abutting relation to the butter being extruded through said die means and means actuated by the movement of said plate member as the same is moved by the butter being extruded, actuating said cut off means.

3. The structure set forth in claim 2 and retraction means associated with said plate member for retraction from abutting position with the extruded butter substantially simultaneously to the actuation of said cut off means.

4. The structure set forth in claim 2 and an impression surface on the side of said movable plate member abutting the butter to impress a design on one side of the patty.

5. The structure set forth in claim 1 wherein said cut off means includes a substantially thin cut off element adjacent said die means with means for moving said element across the die upon actuation thereof to cut a length from the extruding butter.

6. The structure set forth in claim 1 wherein said supply container includes a fibrous container of sufficient peripheral strength to retain the butter therein during the extrusion process.

7. The structure set forth in claim 1 wherein said container retaining means includes a rotatably mounted retainer device having a plurality of container receiving locations spaced thereon with means for locating a container in aligned relation with respect to said ram member.

8. The structure set forth in claim 7 and said retainer device including:
(a) a shaft;
(b) means for rotatably mounting said shaft in relation to said cam member;
(c) at least one radially extending flange on said shaft for rotation therewith;
(d) at least one radially extending opening formed in the periphery of said flange to receive and retain a supply container therein; and
(e) means for positioning said shaft, flange and container with respect to said cam.

References Cited

UNITED STATES PATENTS

| | | | |
|---|---|---|---|
| 722,661 | 3/1903 | Bahr | 25—11 |
| 1,268,510 | 6/1918 | Straight | 31—13 |
| 1,703,553 | 2/1929 | Slaten | 31—20 |
| 3,428,001 | 2/1969 | Zwart et al. | 107—14 |

ALDRICH F. MEDBERY, Primary Examiner

U.S. Cl. X.R.

31—20, 7